June 3, 1930. A. A. THOMAS 1,761,646
CHAIN FASTENER
Filed May 18, 1929
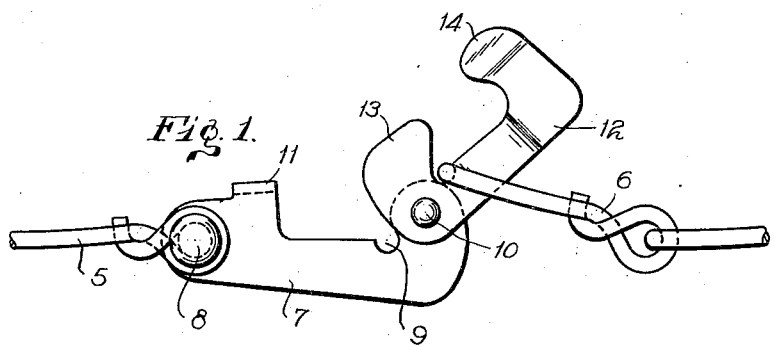
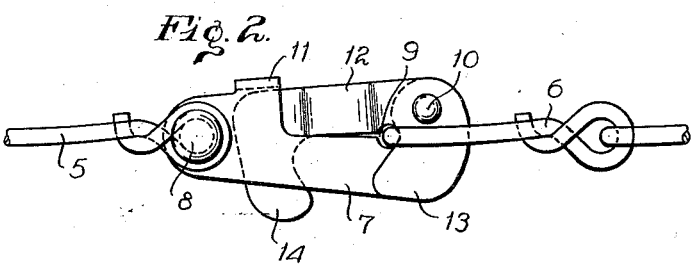
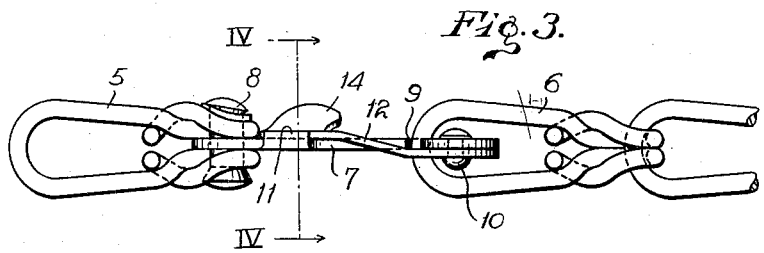
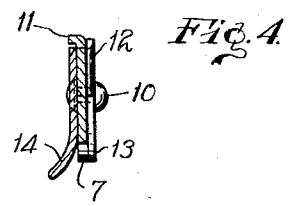
INVENTOR
Albin A. Thomas,
By Archworth Martin,
Attorney.

Patented June 3, 1930

1,761,646

UNITED STATES PATENT OFFICE

ALBIN A. THOMAS, OF YORK, PENNSYLVANIA, ASSIGNOR TO UNITED STATES CHAIN & FORGING COMPANY, OF PITTSBURGH, PENNSYLVANIA, A CORPORATION OF DELAWARE

CHAIN FASTENER

Application filed May 18, 1929. Serial No. 364,199.

My invention relates to chain fasteners, and more particularly to tightening and connecting devices such as are employed in fastening the side chains of anti-skid chain structures that are employed on automobile wheels, but it is capable of use in various other relations.

One object of my invention is to provide a fastener that may be readily operated to connect chain links or the like and which is conveniently operable to release chain links that are connected thereby.

Another object of my invention is to provide a fastening device which is not likely to become accidentally disengaged, and which is nevertheless of simple form.

Still another object of my invention is to provide a fastening device of generally simplified and improved form.

One form which my invention may take is shown in the accompanying drawing, wherein Figure 1 is a side elevational view of the fastening device in open position; Fig. 2 is a similar view showing the device in closed position; Fig. 3 is a plan view of the structure of Fig. 2, and Fig. 4 is a view taken on the line IV—IV of Fig. 3.

Only so much of a chain is shown as is necessary to an understanding of my invention. The chain links shown in the drawing may conveniently comprise the opposite end links of a side chain such as are employed on the ordinary automobile anti-skid chains. These end links are represented by the numerals 5 and 6. The link 5 is shown as permanently secured to a connecter bar or fastener body 7 by means of a rivet or pin 8. This end of the connecter, I will, for convenience of description, term the forward end.

The upper intermediate portion of the bar 7 is cut away as shown more clearly in Fig. 1, and it has a link-receiving recess 9. A rivet or pivot pin 10 is carried by the bar above the recess 9, while the forward portion of the bar 7 is provided with a laterally-extending lug or lip 11.

A latch lever 12 is pivotally connected to the pin 10 and has a tail portion 13 at its rear end and a tongue portion 14 at its forward end. The tail portion 13 is disposed against one side of the bar 7, while, when the lever is closed as in Figs. 2 to 4, its tongue portion 14 is disposed at the opposite side of the bar 7, the intermediate portion of the lever being bent laterally as shown more clearly in Fig. 3 and extending across the upper edge of the intermediate portion of the bar 7.

The lever 12 may conveniently be formed of stamped metal of spring-like material so that it will snap beneath the lip 11 when the lever is moved to closed position, the outwardly bent tongue portion 14 serving as a guide or camming surface to permit convenient movement of the lever to closed position. This tongue portion preferably extends below the lower edge of the bar 7 so that by an outward and upward push thereon, it can be caused to move to open position, the outward pressure against the curved surface 14 serving to move it from beneath the lug 11, and the upward pressure causing it to swing in a clockwise direction about its pivot 10.

The arrangement whereby the forward end of the latch lever 12, when closed, lies at one side of the bar 7 and its rear end at the other side thereof makes for safety, since it is not likely to become disengaged even though considerable looseness develop at the pivot.

It will be understood that when the lever 12 is moved from the position shown in Fig. 1 to the position shown in Fig. 2, the link 6 is carried into its seat in the recess 9, while backward movement of the lever 12 will force the link 6 out of said recess.

The lever 12 adjacent to the base of its tail portion 13 is semi-circularly recessed to provide a seat for the link 6, in guiding it to position within the seat 9, and also serving to assist in preventing accidental detachment of the link 6 from the latch lever 12 in case such lever should accidentally become opened. It will be seen that if the lever 12 were swung back farther than shown in Fig. 1, its outermost end would bear against the upper rear portion of the link 6, and since the inner end of the link lies within the semi-circular recess referred to, the link will not readily slide from the lever. Again, the tongue 14 of the lever is curved somewhat toward the pivot point 10 so that it serves as a hook to still further prevent accidental disengagement of the link 6, when the lever is completely opened.

I claim as my invention:—

1. A chain fastener comprising a connecter bar having a cut-out portion intermediate its ends, means at its forward end for connection to a chain link, a latch lever pivotally connected to the rear end of the bar and having its rear portion disposed against one side of the bar, and a tongue portion at the forward end of the lever, the lever being laterally deflected intermediate its ends and extending over said cut-out portion to permit movement of said tongue portion into position against the other side of the bar when the lever is closed.

2. A chain fastener comprising a connecter bar having a cut-out portion intermediate its ends, means at its forward end for connection to a chain link, a latch lever pivotally connected to the rear end of the bar and having its rear portion disposed against one side of the bar, a tongue portion at the forward end of the lever, the lever being laterally deflected intermediate its ends to permit movement of said tongue portion into position against the other side of the bar when the lever is closed, and a latching lug projecting from one side of the said bar in position to engage the said lever when the lever is in closed position.

3. A chain fastener comprising a connecter bar having a cut-out portion intermediate its ends, means at its forward end for connection to a chain link, a latch lever pivotally connected to the rear end of the bar and having its rear portion disposed against one side of the bar, and a tongue portion at the forward end of the lever, the lever being laterally deflected intermediate its ends to permit movement of said tongue portion into position against the other side of the bar when the lever is closed, and a latching lug projecting from one side of the said bar in position to engage the said lever when the lever is in closed position, the said tongue portion being of such length that it protrudes beyond the lower edge of the bar to serve as a thumb piece for springing the lever laterally out of engagement with said latching lug.

4. A chain fastener comprising a connecter bar having a cut-out portion intermediate its ends, means at its forward end for connection to a chain link, a latch lever pivotally connected to the rear end of the bar and having its rear portion disposed against one side of the bar, and a tongue portion at the forward end of the lever, the lever being laterally deflected intermediate its ends to permit movement of said tongue portion into position against the other side of the bar when the lever is closed, and a latching lug projecting from one side of the said bar in position to engage the said lever when the lever is in closed position, the said tongue being bent sidewise to serve as a camming surface for directing the lever past said lug when the lever is being moved to closed position.

5. A chain fastener comprising a connecter bar having a link-engaging recess formed therein, a latch lever pivotally connected to said bar at a point adjacent to said recess, a tail portion projecting from the inner edge of said lever adjacent to the point, a tongue portion projecting from the inner edge of the lever at a point adjacent to the other end thereof, the inner extremities of said tail and tongue portions projecting toward one another.

6. A chain fastener comprising a connecter bar having a link-engaging recess formed therein, a latch lever pivotally connected to said bar at a point adjacent to said recess, a tail portion projecting from the inner edge of said lever adjacent to the pivot, and a tongue portion projecting from the inner edge of the lever at a point adjacent to the other end thereof, the inner extremity of the tongue portion projecting toward the said tail portion.

7. A chain fastener comprising a connecter bar having an upwardly extending portion, a latch lever pivoted to said portion, a tail portion on the inner edge of said lever at a point adjacent to said pivot, the said lever being provided with a link-engaging recess adjacent to the base of the said tail portion, and being of such length that the outer end of the lever will abut against the opposite end of a link which is seated in said recess.

8. A chain fastener comprising a connecter bar, and a latch lever pivotally connected to said bar, the said lever and bar, when the lever is closed, being crossed at their intermediate portions, whereby one end of the lever will be disposed against one side of the bar and the opposite end of the lever disposed against the other side of the bar.

9. A chain fastener comprising a connecter bar, a latch lever pivotally connected to said bar, the said lever and bar, when the lever is closed, being crossed at their portions, whereby one end of the lever will be disposed against one side of the bar and the opposite end of the lever disposed against the other side of the bar, and a laterally-extending locking device for holding the lever in closed position, the lever being formed of yieldable material to permit it to be moved past said locking device.

In testimony whereof I, the said ALBIN A. THOMAS have hereunto set my hand.

ALBIN A. THOMAS.